US012720034B2

(12) United States Patent
Li et al.

(10) Patent No.: US 12,720,034 B2
(45) Date of Patent: Aug. 25, 2026

(54) THREE-DIMENSIONAL IMAGING SYSTEM AND METHOD

(71) Applicant: Wayne State University, Detroit, MI (US)

(72) Inventors: Wen Li, Troy, MI (US); Suk Kyoung Lee, Troy, MI (US)

(73) Assignee: Wayne State University, Detroit, MI (US)

(*) Notice: Subject to any disclaimer, the term of this patent is extended or adjusted under 35 U.S.C. 154(b) by 0 days.

(21) Appl. No.: 19/094,305

(22) Filed: Mar. 28, 2025

(65) Prior Publication Data

US 2025/0310503 A1 Oct. 2, 2025

Related U.S. Application Data

(60) Provisional application No. 63/571,522, filed on Mar. 29, 2024.

(51) Int. Cl.

*H04N 13/254* (2018.01)
*G01S 7/4865* (2020.01)
*G01S 17/894* (2020.01)
*H04N 13/239* (2018.01)
*H04N 13/246* (2018.01)
*H04N 13/296* (2018.01)

(52) U.S. Cl.

CPC ......... *H04N 13/296* (2018.05); *G01S 7/4865* (2013.01); *G01S 17/894* (2020.01); *H04N 13/239* (2018.05); *H04N 13/246* (2018.05); *H04N 13/254* (2018.05)

(58) Field of Classification Search

CPC .. H04N 13/296; H04N 13/239; H04N 13/246; H04N 13/254; H04N 23/60; H04N 23/90; G01S 7/4865; G01S 17/894; G01S 17/18

USPC ............................................................ 348/47

See application file for complete search history.

(56) References Cited

U.S. PATENT DOCUMENTS 10,514,256 B1 * 12/2019 Kamarshi ................ G01C 3/08
11,682,140 B1 * 6/2023 Daly, Jr. ................... G06T 7/85 348/47
11,899,354 B1 * 2/2024 Zhang ...................... G06F 17/18
12,313,776 B2 * 5/2025 Piggott ................. G01S 7/4814
2022/0230216 A1 * 7/2022 Buibas ................... G06Q 30/02
2022/0265969 A1 * 8/2022 Pancaldi ........... A61M 25/0125
2025/0008939 A1 * 1/2025 Fuji ....................... A01M 1/226
(Continued)

*Primary Examiner* — Helen Shibru
(74) *Attorney, Agent, or Firm* — Fishman Stewart PLLC

(57) ABSTRACT

A 3D imaging system may include a laser source, a first camera, a second camera, a delay generator, and a computer. The first camera and the second camera may each be arranged and oriented to detect reflected photons of a laser pulse emitted by the laser source. The delay generator may be configured to provide a plurality of signals that active at least one of the laser source, the first camera, and the second camera. The computer may be configured to receive a first output signal from the first camera, receive a second output signal from the second camera, determine a time-of-flight based at least partially on the first and second output signals and a brightness-time calibration curve, convert the time-of-flight to a distance, determine a 3D coordinate based at least partially on the distance, and/or generate a 3D point cloud utilizing the 3D coordinate.

20 Claims, 6 Drawing Sheets

(56) References Cited

U.S. PATENT DOCUMENTS

2025/0184468 A1* 6/2025 Ferrario .................. G01S 17/18
2025/0264586 A1* 8/2025 Assmann .............. G01S 7/4865

* cited by examiner

THREE-DIMENSIONAL IMAGING SYSTEM AND METHOD

CROSS-REFERENCE TO RELATED APPLICATIONS

This application claims priority to U.S. Provisional Patent Application No. 63/571,522, filed on Mar. 29, 2024, the contents of which is hereby incorporated by reference in its entirety.

STATEMENT REGARDING FEDERALLY SPONSORED RESEARCH AND DEVELOPMENT

This invention was made with government support under CHE2107860 and PHY2012098 awarded by NATIONAL SCIENCE FOUNDATION. The government has certain rights in the invention.

TECHNICAL FIELD

The present disclosure generally relates to a three-dimensional (3D) imaging system (e.g., a time-to-brightness converter and/or a light detection and ranging (LIDAR) system and/or device), particularly to a low-cost and high performing 3D imaging system, and a method of 3D imaging.

BACKGROUND

Three-dimensional (3D) imaging, also known as stereo vision, measures the 3D shape of objects or the surrounding environment. In recent years, there has been a great demand for high-performing and low-cost 3D imaging technologies. This is partly due to the need to equip future autonomous vehicles with the capability to reconstruct road/traffic conditions. Light detection and ranging (LIDAR), as one type of implementation of 3D imaging, is widely considered one of the critical enabling technologies for fully driverless cars. In this technique, a pulsed laser emits photons in short bursts (a few nanoseconds). These photons are bounced back toward a receiver when encountering objects. The distance of the object from the receiver can be determined if the time of flight (TOF) of the reflected photons can be measured using $D=TOF\times c/2$, in which c is the speed of light. This is the basic principle underlying the so-called direct TOF (dTOF) LIDAR method. The dTOF method has the range advantage (a few hundred meters) over the indirect TOF (iTOF) method and thus is well suited for advanced driver assistance systems (ADAS). In the past decade, dTOF LIDAR techniques have been intensively studied using various implementations. Most of these focus on developing robust techniques for scanning laser-pointing directions to achieve 3D mapping while employing a point photodetector such as a single-photon avalanche photodiode (SPAD). A different implementation is to use a 3D array photodetector coupled with a large area laser illumination. This is the flash LIDAR technique. The apparent advantage is the speed of such a method: a single shot can produce a complete 3D point cloud, in principle. However, the method requires an advanced 3D photodetector, which can measure the TOFs of many photons arriving at different pixels in a single shot. SPAD array detectors have attracted much attention for their high sensitivity and timing resolution. However, the number of pixels in such a detector is still limited because the read-out of such an array is not trivial. Other 3D detectors do exist such as the Timepix-based cameras, the event-driven neuromorphic cameras, the 3D two-tap pixel sensor, and the interline transfer CCD (charge-coupled device) based 3D camera. But these have either a limited time resolution or the cost is prohibitively high.

A conventional camera (e.g., a CMOS camera, a CCD camera) can measure the 2D front views of an object. All these cameras have an inherent time resolution associated with their frame rates and thus they are 3D array detectors intrinsically. However, because the time resolution is very low (a few tens milliseconds), the resulting distance resolution (thousands of kilometers) is not useful. Modern CMOS cameras can achieve a shutter speed of one microsecond, but this is still too large for measuring distance. In mimicking human eyes, two cameras set at a distance can even achieve stereo vision. However, such a technique has a limited range and accuracy and it is computationally intensive.

Thus, there is a need for an improved 3D imaging system and method for 3D imaging.

SUMMARY

In one aspect, a 3D imaging system may include a laser source configured to emit a laser pulse, a first camera, a second camera, a delay generator, and a computer. The first camera and the second camera may each be arranged and oriented to detect reflected photons of the laser pulse emitted by the laser source. The delay generator may be connected to the laser source, the first camera, and the second camera. The delay generator may be configured to provide a plurality of signals that active at least one of the laser source, the first camera, and the second camera. The computer may be communicatively coupled to the first camera and the second camera. The computer may be configured to receive a first output signal from the first camera, receive a second output signal from the second camera, determine a time-of-flight based at least partially on the first output signal, the second output signal, and a brightness-time calibration curve, convert the time-of-flight to a distance, determine a 3D coordinate based at least partially on the distance, and/or generate a 3D point cloud utilizing the 3D coordinate.

In another aspect, a 3D imaging system may include a laser source configured to emit a laser pulse, a light source, a first camera, a second camera, a delay generator, and a computer. The first camera may be arranged and oriented to detect reflected photons of the laser pulse emitted by the laser source. The second camera may be arranged and oriented to detect (i) reflected photons of the laser pulse emitted by the laser source and (ii) light emitted by the light source. The delay generator may be connected to the laser source, the light source, the first camera, and/or the second camera. The delay generator may be configured to provide a plurality of signals that active at least one of the laser source, the light source, the first camera, and the second camera. The computer may be communicatively coupled to the first camera and the second camera. The first camera may have a first shutter delay such that the reflected photons of the laser pulse arrive at the first camera during a full exposure period of a shutter of the first camera. The second camera may have a second shutter delay such that the reflected photons of the laser pulse arrive at the second camera during a rising edge of a shutter of the second camera. The computer may be configured to receive a first output signal from the first camera, receive a second output signal from the second camera, determine a shutter jitter adjustment value for a frame captured by the second camera based on the second output signal and a jitter calibration curve, determine a measured arrival time for a pixel in the frame based on the first output signal, the second output signal, and a brightness-time calibration curve, determine an adjusted arrival time for the pixel based on the measured arrival time and the shutter jitter adjustment value, determine a time-of-flight for the pixel based at least partially on the adjusted arrival time, convert the time-of-flight to a distance, determine a 3D coordinate associated with the pixel based at least partially on the distance, and/or generate a 3D point cloud utilizing the 3D coordinate.

In a further aspect, a method of 3D imaging may include emitting a laser pulse via a laser source, shuttering a first camera and shuttering a second camera to capture a respective frame to detect reflected photons of the laser pulse, sending a first output signal from the first camera to a computer, and sending a second output signal from the second camera to the computer. The first output signal may correspond to the frame captured by the first camera. The second output signal may correspond to the frame captured by the second camera. The method may further include determining, via the computer, a time-of-flight based on the first output signal, the second output signal, and a brightness-time calibration curve, converting the time-of-flight to a distance, determining a 3D coordinate based at least partially on the distance, and/or generating a 3D point cloud utilizing the 3D coordinate.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and embodiments are not restricted to the precise form and configuration shown in the drawings or disclosed in the following detailed description. Exemplary illustrations are described in detail by referring to the drawings as follows:

DETAILED DESCRIPTION

Figure 1:
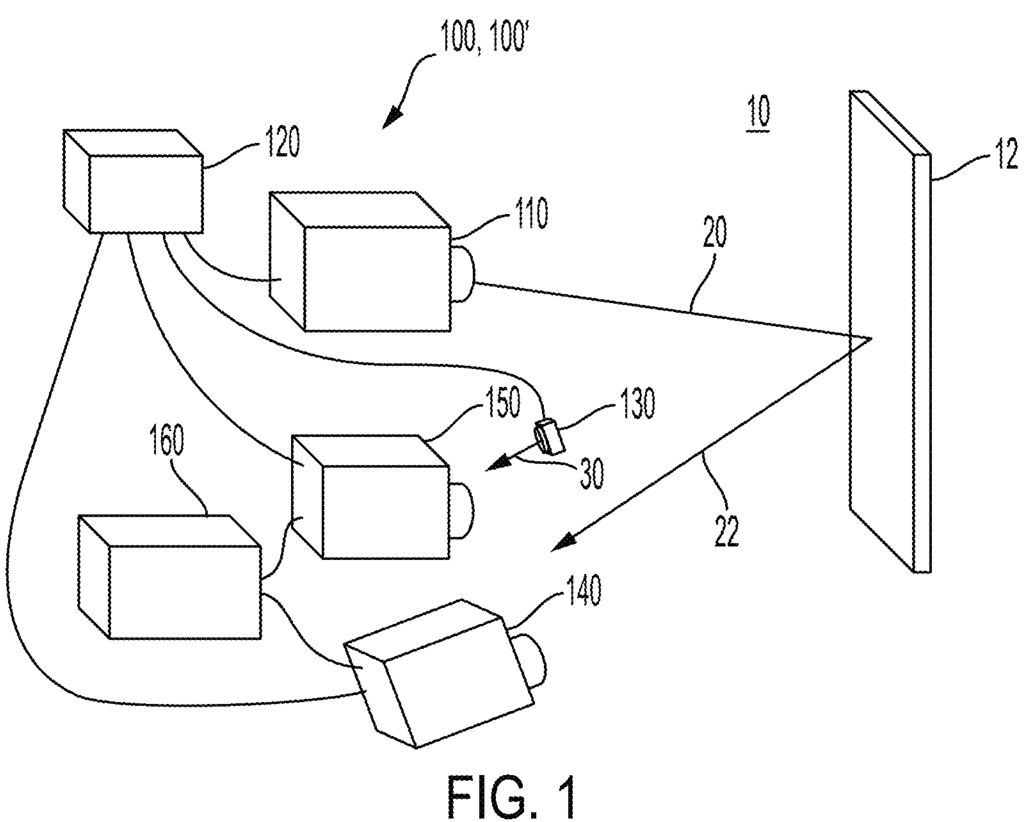
FIG. 1 is a schematic illustration of an exemplary 3D imaging system.

Disclosed is a three-dimensional (3D) imaging system 100 and method for 3D imaging that, unlike other conventional systems, does not utilize specialized timing devices or fast frame cameras. The disclosed system 100 also represents a significant simplification and cost-reduction in comparison with existing 3D imaging systems. The system 100 may be useful for a number of different applications and may be implemented differently (e.g., include additional components, features, and/or elements) based on the desired application. In some examples, the system 100 is implemented in a LIDAR system and/or apparatus 100'. The system 100 and/or method may also be utilized in other fields that utilize wide-field photon TOF measurement, such as wide-field fluorescence lifetime microscopy (wf-FLIM) and ion/electron 3D momentum imaging.

The disclosed system 100 and method of 3D imaging is able to measure the arrival time of photons with a sub-nanosecond time resolution using just conventional cameras. The system 100 and method accomplish this by exploiting the finite rise/fall time of the electro-optical global shutter implemented in modern cameras, such as complementary metal-oxide semiconductor (CMOS) cameras. The disclosed 3D imaging method can be implemented at the pixel level of a camera and thus simultaneously provide a high spatial resolution to achieve high-performing 3D imaging.

The system 100 employs two complementary metal-oxide semiconductor (CMOS) cameras 140, 150 to capture reflected photons 22 and utilizes i) pixel brightness during a full exposure period of a shutter of the first camera 140 and ii) pixel brightness during an edge (e.g., a rising edge and/or a falling edge) of a shutter of the second camera 150 to extract, determine, and/or calculate the arrival time of the photons 22, which is then utilized to obtain and/or generate 3D coordinates (x-position, y-position, z-position) and/or 3D point clouds. The system 100 achieves a time resolution of 0.3 ns (nanoseconds) or less.

According to the disclosure, the system 100 includes (i) a laser source 110 configured to emit a laser, laser beam, and/or one or more laser pulses 20 (e.g., photons) into an environment 10 and/or to an object 12 that reflects one or more photons 22 of the laser pulse 20, (ii) a delay generator 120 connected to the laser source 110, (iii) a light source 130 configured to emit light 30 (e.g., photons), (iv) a first camera 140 and a second camera 150 directed toward the environment 10, connected to and activatable and/or triggerable by the delay generator 120, and configured to provide and/or output a signal to a computer 160 connected thereto, and (v) a computer 160 communicatively connected to the first camera 140 and the second camera 150 for providing operations. The computer 160, for example, is configured to receive a first output signal from the first camera 140, receive a second output signal from the second camera 150, calculate an arrival time and/or a TOF of the reflected photons 22 based on the first output signal, the second output signal, a brightness-time calibration curve, and, optionally, a jitter calibration curve, convert the calculated arrival time and/or TOF to a distance, obtain a 3D coordinate associated with a pixel based on the calculated distance and the position of the pixel that detected the reflected photons 22, and generate and/or provide a 3D point cloud for a frame utilizing the 3D coordinates associated with the pixels in the frame.

The laser source 110 is configured to emit a laser, laser beam, and/or one or more laser pulses 20 (i.e., photons) into an environment 10 and/or to an object 12 to provide one or more reflected photons 22. The laser source 110 is operatively (e.g., communicatively and/or physically) coupled to the delay generator 120 and is configured to be activated and/or triggered by the delay generator 120 (e.g., via receiving a laser trigger signal from the delay generator 120). The laser source 110 is positioned and oriented to emit the laser pulse 20 to one or more objects 12 disposed in the environment 10. Each laser pulse 20 is emitted into the environment 10 and strikes, contacts, and/or impinges on one or more objects 12 in the environment 10, which causes and/or results in the object 12 reflecting at least some photons of the laser pulse 20 back to the system 100, laser source 110, and/or cameras 140, 150 as reflected photons 22 and/or as one or more groups or pulses of reflected photons 22. For example, photons reflected by a first object 12 may be considered a first pulse of reflected photons 22 (i.e., a first photon pulse) and photons reflected by a different second object 12 may be considered a second pulse of reflected photons 22 (i.e., a second photon pulse), which may or may not have a different TOF than the first pulse of reflected photons 22.

Figure 2:
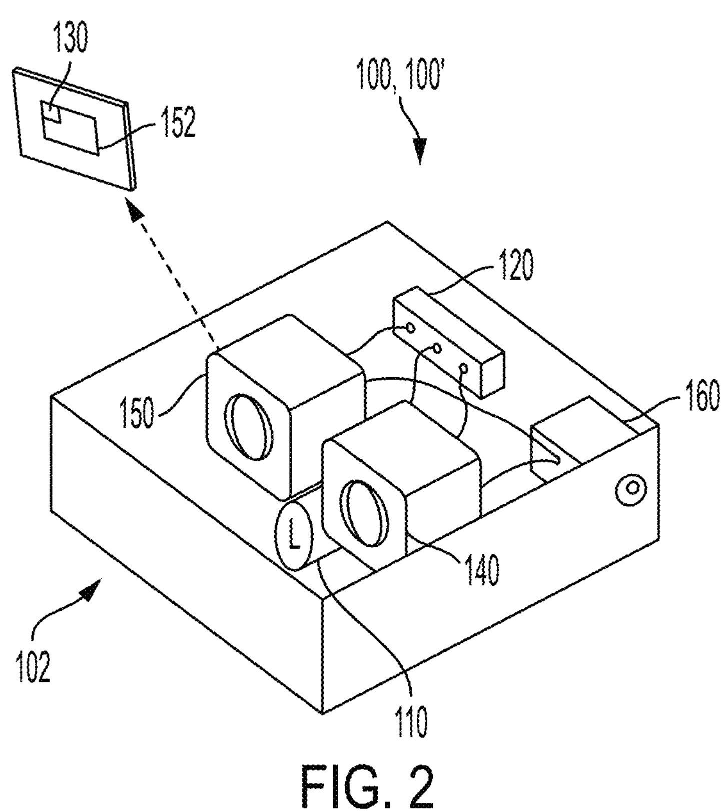
FIG. 2 is a simplified illustration of another exemplary 3D imaging system.

The system 100 includes two 2D image sensors, which in the illustrative example described herein, are configured, structured, and/or embodied as a first camera 140 and a second camera 150. The cameras 140, 150 are positioned and/or arranged in close proximity to one another (e.g., directly adjacent to one another vertically and/or horizontally). The cameras 140, 150 are oriented, aimed, and/or focused on an environment 10 and/or an object 12 disposed therein to capture, collect, detect, and/or measure the reflected photons 22 provided by the object 12 (e.g., photons of the laser pulse 20 emitted by the laser source 110 that have been reflected) as generally illustrated in FIG. 1. The cameras 140, 150 are arranged and oriented relative to one another such that the field of view of the first camera 140 and the field of view of the second camera 150 are substantially identical. As a result of the substantially identical fields of view, the amount of distortion and/or the differences between frames captured by the first camera 140 and frames captured by the second camera 150 are minimized, which results in the outputs (e.g., pixel brightnesses) of the first camera 140 providing a more accurate and/or precise normalization of the outputs (e.g., pixel brightnesses) of the second camera 150. In contrast, the cameras 140, 150 and the laser source 110 may not be aligned with one another (e.g., arranged vertically one above another; arranged side-by-side), may not be disposed adjacent and/or in close proximity to one another, and/or may be oriented in different directions. For example, the laser source 110 may be arranged within and/or be a part of a driver-side headlight of a vehicle and the cameras 140, 150 may be arranged within and/or be a part of a passenger-side headlight of the vehicle. In other examples, the laser source 110, the cameras 140, 150, the light source 130, and/or the delay generator 120 are arranged in close proximity to one another and, optionally, are disposed within and/or at least partially enclosed by a common housing 102 as generally illustrated in FIG. 2.

The cameras 140, 150 are operatively (e.g., communicatively and/or physically) connected to the delay generator 120, and are configured to receive and be activated, triggered, and/or shuttered by a first camera trigger signal and a second camera trigger signal, respectively, provided by the delay generator 120. The first camera 140 has and/or is triggered with a first camera delay such that a shutter of the first camera 140 begins prior to the reflected photons 22 reaching the first camera 140 and the reflected photons 22 reach the first camera 140 during the full exposure period of the shutter resulting in the first camera 140 capturing the full and/or maximum pixel brightness produced by the reflected photons 22. The second camera 150 has and/or is triggered with a second camera delay such that a shutter of the second camera 150 begins as the reflected photons 22 reach the second camera 150 and/or the reflected photons 22 reach the second camera 150 during the rising edge of the second camera's shutter.

The cameras 140, 150 are also operatively (e.g., communicatively and/or physically) connected to the computer 160, and are configured to send a first output signal and a second output signal to the computer 160, respectively. The first output signal corresponds to a frame captured by the first camera 140 and includes the output of each pixel of a sensor array of the first camera 140, which collectively represent, form, and/or define the frame captured when the first camera 140 is triggered and/or shuttered. The second output signal corresponds to a frame captured by the second camera 150 and includes the output of each pixel of a sensor array 152 of the second camera 150, which collectively represent, form, and/or define the frame captured when the second camera 150 is triggered and/or shuttered.

The cameras 140, 150 are jointly described below for brevity. The camera 140, 150, which is a 2D image sensor, includes a sensor array with (e.g., millions) of photosensitive pixels covering a surface of the sensor array. The camera 140, 150 has a complementary metal-oxide semiconductor (CMOS) sensor array and/or is a CMOS camera in the illustrative example described herein, but the camera may have a different type of sensor array (e.g., CCD, SPAD, etc.), may be a different type of camera (a CCD camera, CMOS camera, and/or SPAD camera), and/or may be a different type of 2D image sensor in other examples. The pixels collect photons from light, which are converted to an electrical charge and transmitted as electrical signals. The sensor array may utilize a 'global shutter' in which all pixels of the sensor array are exposed simultaneously to capture a frame and/or image. Each activation (or shutter) of the camera 140, 150 and/or sensor array captures a single frame and/or image. When activated, triggered, and/or shuttered, the camera 140, 150 (e.g., a chip, ECU, processor, and/or control module thereof) is configured to gather, accumulate, and/or store (at least temporarily) the output of each pixel of the sensor array (e.g., the electrical charge produced by each photodiode of the CMOS sensor array) for the captured frame and/or image.

Figures 3A, 3B:
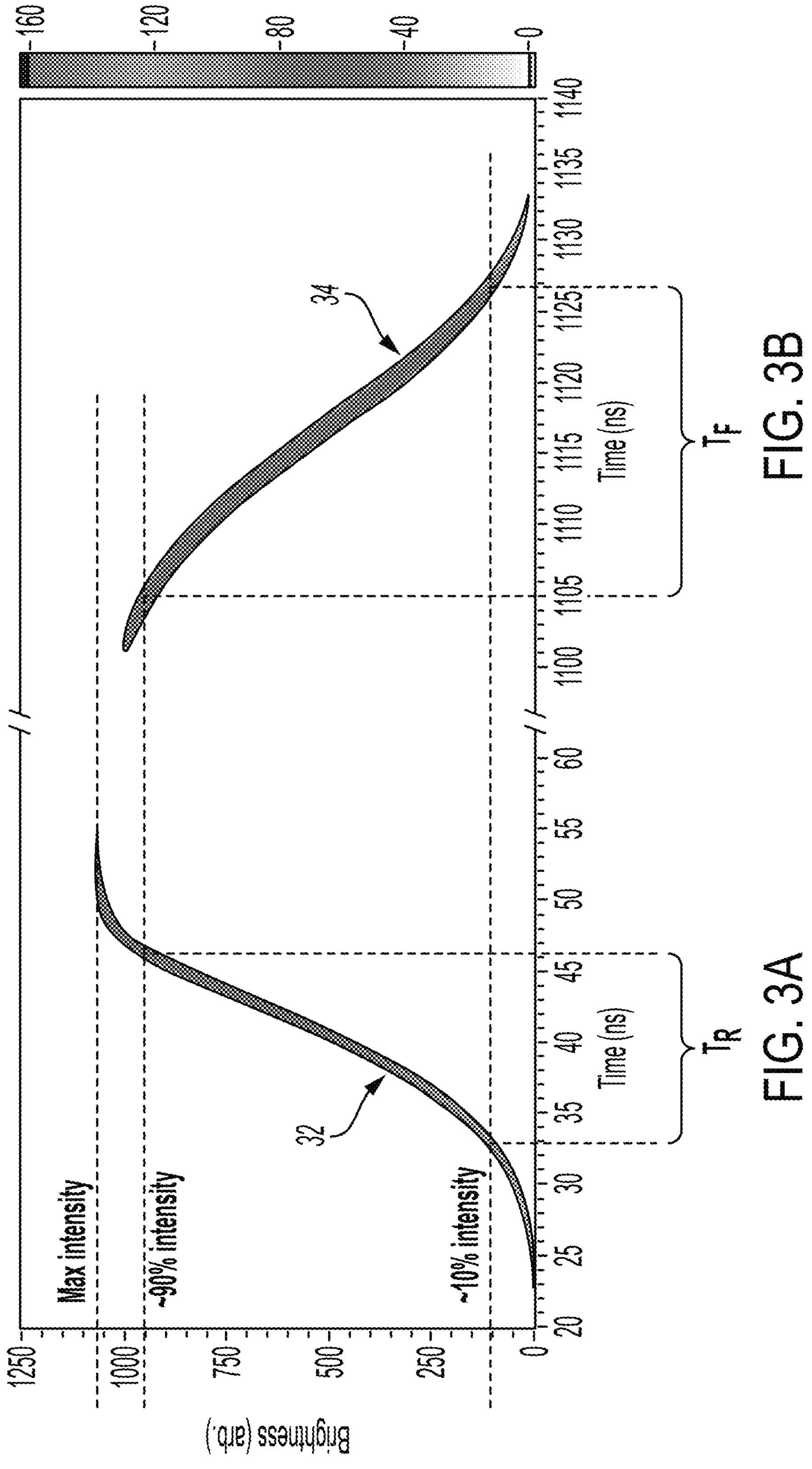
FIGS. 3A and 3B illustrate the rising edge and the falling edge of an exemplary camera shutter, respectively.

Each shutter of the camera 140, 150 (i.e., a camera shutter) has a time duration or an exposure time (e.g., 1 millisecond, 1 microsecond) during which the pixel sensitivity/gain remains constant (e.g., at 100% and/or max intensity). As generally illustrated in FIGS. 3A and 3B, the portion or region of the shutter process during which the pixel sensitivity/gain remains constant (e.g., at 100% and/or max intensity) may be considered and/or referred to as the full exposure period. The portion or region of the shutter process prior to the full exposure period during which the sensitivity/gain increases from 10% to 90% of max intensity may be considered and/or referred to as the rising edge 32 of the shutter. The amount of time for the sensitivity/gain to increase from 10% to 90% of max intensity is referred to as the rise time $T_R$ (e.g., $T_R$=~12.9 ns in FIG. 3A). The portion or region of the shutter process following full exposure period during which the pixel sensitivity/gain decreases from 90% to 10% of max sensitivity/gain may be considered and/or referred to as the falling edge 34 of the shutter. The amount of time for the sensitivity/gain to decrease from 90% to 10% of max intensity is referred to as the fall time $T_F$ (e.g., $T_F$=~19.6 ns in FIG. 3B). The rising edge 32 and the falling edge 34 are therefore separated by the exposure time (e.g., 1 millisecond, 1 microsecond), which is the time duration of the full exposure period of the shutter process.

Figure 4:
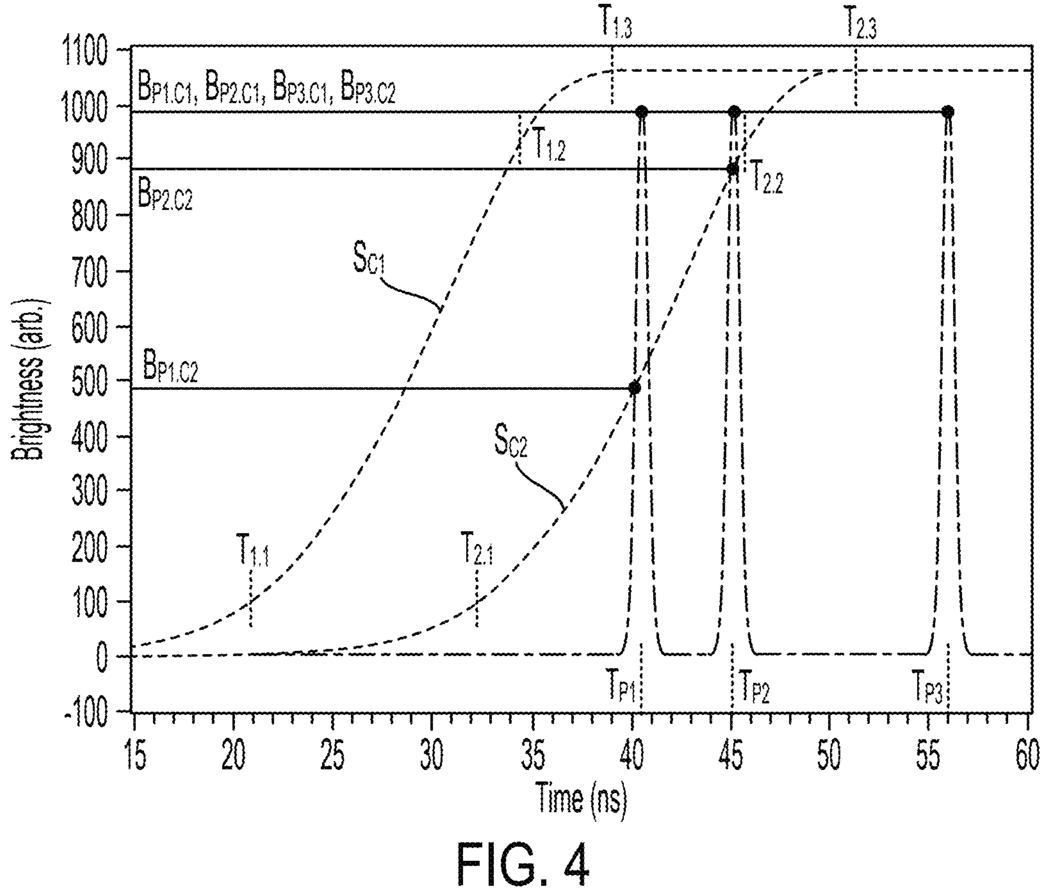
FIG. 4 is an exemplary pixel brightness vs. time graph showing the brightness of a pixel contacted by photon pulses at three different times overlayed by the pixel sensitivity/gain during the shutter of a first camera and the pixel sensitivity/gain during the shutter of a second camera.

When reflected photons 22 arrive at and/or contact a pixel during the rising edge and/or the falling edge of the shutter of the camera 140, 150, the brightness of the pixel that is captured and/or detected in the frame is limited by the pixel sensitivity/gain during the rising and/or falling edge. In other words, the pixel sensitivity/gain during the rising and/or falling edge may prevent the full extent of the brightness of a pixel from being captured and/or detected in the frame. In FIG. 4, for example, the full extent of the pixel brightness produced by a first photon pulse (i.e., pixel brightness $B_{P1.C1}$) is captured by first camera 140. The second camera 150, however, would be unable to capture the full extent of the pixel brightness produced by the first photon pulse due to the pixel sensitivity/gain during the rising edge of the shutter $S_{C2}$ and the second camera 150 would only capture and/or detect a pixel brightness of $B_{P1.C2}$. The variation in the pixel sensitivity/gain during the rising edge and during the falling edge thus leads to pixel brightness variation for photons detected and/or captured during the rising edge and during the falling edge. For example, as generally illustrated in FIG. 4, a first photon pulse arriving at the second camera 150 at a first time $T_{P1}$ and a second photon pulse arriving at the second camera 150 at a second time $T_{P2}$ would have a detected brightness (i.e., produce a pixel brightness) of $B_{P1.C2}$ and $B_{P2.C2}$, respectively, since each photon pulse arrived and/or was captured during the rising edge of the second camera's shutter $S_{C2}$. However, the first camera 140 would detect a brightness of $B_{P1.C1}$ and $B_{P2.C1}$, respectively, for these same photon pulses since they arrived during the full exposure period of the first camera's shutter $S_{C1}$. The first camera 140 and the second camera 150 would detect the same brightness, a pixel brightness of $B_{P3.C1}$ and $B_{P3.C2}$, respectively, for a third photon pulse arriving at a third time $T_{P3}$, which is during the full exposure period of the first camera's shutter $S_{C1}$ and the second camera's shutter $S_{C2}$. Pixel brightness during the rising edge and/or during the falling edge of the shutter may therefore be utilized to calculate the arrival time of reflected photons 22 arriving during the rising and/or falling edge. The operation and/or processes of the system 100 and the method described herein utilize the rising edge, but the falling edge may alternatively be used. Utilization of the rising edge is generally preferred as performance of the system 100 is influenced less by shutter jitter than when utilizing the falling edge.

Figure 5A:
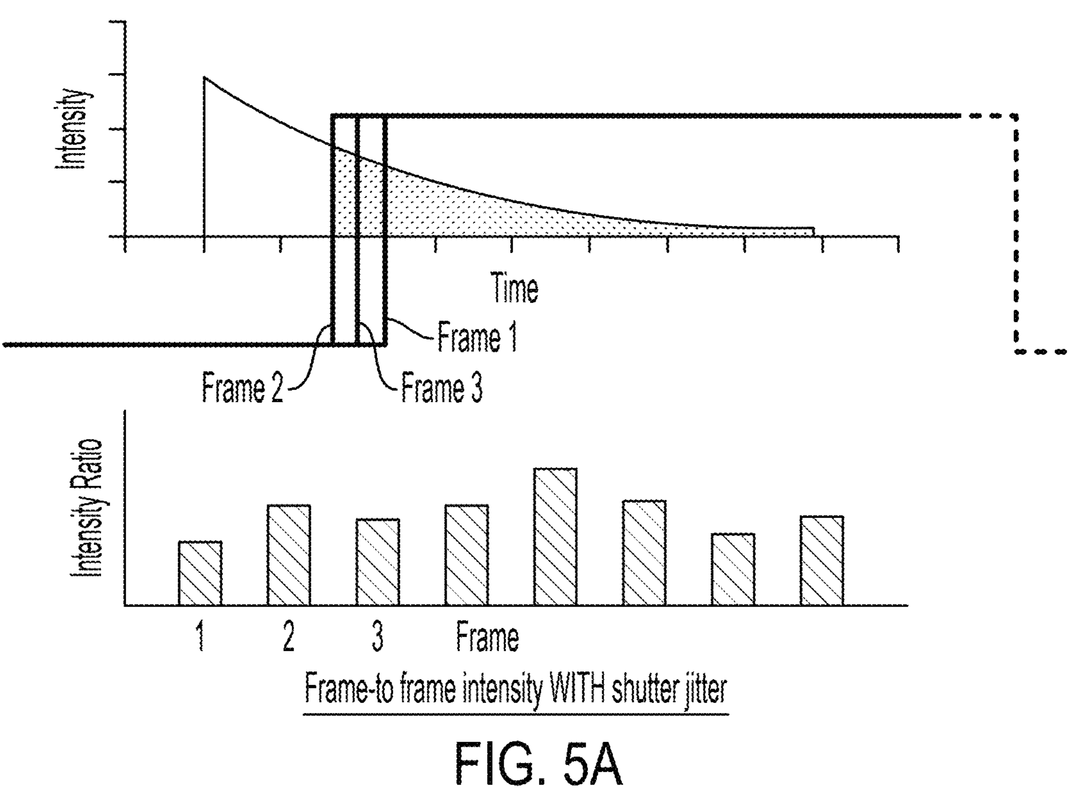
FIGS. 5A and 5B illustrate an exemplary characterization of the frame-to-frame variation in actual shutter opening time and intensity ratio of a camera with shutter jitter and a camera without shutter jitter, respectively.
Figure 5B:
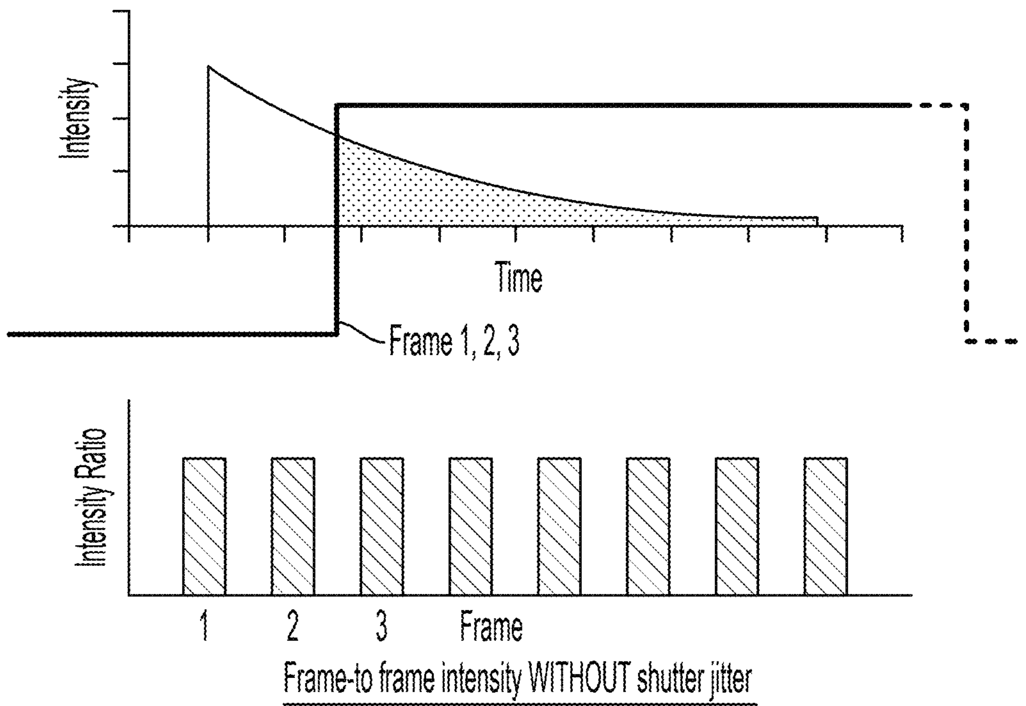

From frame to frame, there is a small variation in the amount of time between the shutter trigger time and the actual shutter opening time, which may be referred to as shutter jitter, trigger jitter, camera jitter, and/or camera shutter jitter. Practically speaking, all cameras inherently have shutter jitter. Shutter jitter is evidenced by the peak Q value changing from shot to shot of the laser, and is further quantified with examining TOF distributions within a single laser shot. Shutter jitter, as well as the influence and/or impact of shutter jitter on the intensity ratio of the respective frame, is illustrated in FIGS. 5A and 5B. As depicted in FIG. 5A, frames 1, 2, and 3 all have the same trigger time but each have a slightly different actual shutter opening time due to shutter jitter (i.e., the rising edges occur at slightly different times and, thus, are offset from one another along the x-axis), which results in a slight variation in the intensity ratio from frame to frame. Conversely, as depicted in FIG. 5B, in a system 100 without shutter jitter the actual shutter opening time is constant from frame to frame (i.e., the rising edge of each frame occurs at the same time and, thus, are aligned with one another on the x-axis) and, as a result, the intensity ratio is also constant from frame to frame.

The actual shutter opening time and/or the timing of the rising edge of the first and second cameras 140, 150 randomly varies from frame to frame during operation of the system 100 due to shutter jitter. This presents a problem when attempting to determine the arrival time of a photon pulse 22 because, while the laser trigger time $T_{LaT}$ and the second trigger time $T_{C2T}$ are known and controllable variables, the amount of time between the second trigger time $T_{C2T}$ and the rising edge (i.e., the shutter jitter) varies randomly from frame to frame and cannot be readily controlled (e.g., suppressed, made consistent from frame to frame, etc.). This can result in photon pulses 22 reflected by the same stationary object 12 to have different determined TOFs and/or distances when in actuality they should each have the same determined TOF and/or distance since they traveled the same distance (i.e., two times the distance between the laser source 110 and the object 12) at the speed (i.e., the speed of light). To overcome the obstacle of shutter jitter, the system 100 utilizes the light source 130 and the detected brightness of the light 30 emitted by the light source 130 to determine and/or account for shutter jitter in each frame captured by the second camera 150.

The light source 130 is configured to emit light and/or a pulse of light 30 (e.g., one or more photons) toward the second camera 150. The light source 130 is an LED light in the illustrative examples herein, but may be another type and/or style of light in other examples. The light source 130 is operatively (e.g., communicatively and/or physically) coupled to the delay generator 120 and is configured to be activated and/or triggered by the delay generator 120 (e.g., via receiving a light trigger signal from the delay generator 120). The light source 130 may, for example, be pulsed by the delay generator 120 with a pulse width of 600 ns. The light source 130 is positioned and oriented to emit light 30 to the second camera 150 and/or a specific subset of pixels (e.g., the LED pixels) of the sensor array 152 of the second camera 150. The light source 130 is positioned and oriented relative to the first camera 140 such that the first camera 140 does not receive, measure, detect, and/or collect the light 30 emitted by the light source 130. In examples, the light source 130 is integrated in the second camera 150 and/or the second camera 150 includes the light source 130. The light source 130, in some examples such as the one depicted in FIG. 2, is arranged on and/or connected to the sensor array 152 of the second camera 150. The light source 130 is aligned with and/or overlaps a subset of pixels of the sensor array 152 (e.g., the LED pixels). Due to the aligned and/or overlapping position, only a subset of the pixels of the sensor array 152 (i.e., the overlapped and/or LED pixels) receive, detect, and/or collect the light 30 emitted by the light source 30. Optionally, the light source 130 and/or the LED pixels of the sensor array 152 overlapped thereby are disposed at or about a corner of the sensor array 152. The light source 130 typically has a relatively small size compared to the sensor array 152 (e.g., a size of 30×30 pixels), which reduces and/or minimizes the amount by which the light source 130 encroaches on and/or obstructs the field of view of the second camera 150. The light source 130 may alternatively be arranged in various other positions (e.g., in front of the second camera 150 and/or a lens thereof as illustrated in FIG. 1) and/or connected to one or more other structures (e.g., a lens or body of the second camera 150, the housing 102, a mounting bracket, etc.).

The delay generator 120 is operatively (e.g., communicatively and/or physically) coupled to the laser source 110, the cameras 140, 150, and the light source 130. Pursuant to an implementation, the delay generator 120 is and/or includes a circuit board (e.g., a printed circuit board), a processor, and/or one or more signal transmitters connected (e.g., via wires or electrical lines) to the laser source 110, the cameras 140, 150, and the light source 130. The delay generator 120 is configured to send signals, such as electrical pulse signals, to the laser source 110, the cameras 140, 150, and the light source 130. A signal sent by the delay generator 120 to the laser source 110, the first camera 140, the second camera 150, and the light source 130 may be referred to as a laser trigger signal, a first camera trigger signal (FC trigger signal), a second camera trigger signal (SC trigger signal), and a light trigger signal, respectively. The signals provided by the delay generator 120 activate and/or trigger the laser source 110, the cameras 140, 150, and/or the light source 130.

The delay generator 120 triggers and/or activates the laser source 110, such as by sending a laser trigger signal, causing the laser source 110 to emit a laser, laser beam, and/or one or more laser pulses 20 (i.e., photons). The time at which the delay generator 120 sends the laser trigger signal and/or the laser source 110 emits the laser pulse 20 may be referred to as a laser trigger time $T_{LaT}$.

The delay generator 120 triggers and/or activates the light source 130, such as by sending a light trigger signal, causing the light source 130 to emit light and/or one or more light pulses 30. The delay generator 120 sends the light trigger signal with a delay (a light source or LS delay) relative to when the laser trigger signal is sent. The length of the LS delay is the amount of time between when the delay generator 120 sends the laser trigger signal and when it sends the light trigger signal (i.e., LS delay=$T_{LiT}$−$T_{LaT}$). The delay generator 120 is configured to send the LS trigger signal to trigger, activate, and/or actuate the light source 130 such that the light 30 emitted by the light source 130 arrives at and/or contacts the second camera 150 (e.g., the sensor array 152 thereof) at and/or around the same time as the reflected photons 22. In this way, both the reflected photons 22 and the light 30 emitted by the light source 130 are ensured to be detected in the same frame of the second camera 150.

The delay generator 120 triggers and/or shutters the cameras 140, 150 causing the cameras 140, 150 to each capture a frame and/or image via measuring, detecting, and/or collecting reflected photons 22 of the laser pulse 20 and/or the light 30 from the light source 130. The delay generator 120 is configured to send a first camera trigger signal (FC trigger signal) to the first camera 140 with a delay (a first camera or FC delay) to trigger and/or shutter the first camera 140. The length of the FC delay is the amount of time between when the delay generator 120 sends the laser trigger signal and when it sends the FC trigger signal (i.e., FC delay=$T_{C1T}$−$T_{LaT}$). The delay generator 120 is configured to send the FC trigger signal to trigger the first camera 140 at a first trigger time $T_{C1T}$ such that a shutter of the first camera 140 begins prior to the reflected photons 22 reaching the first camera 140 and/or the reflected photons 22 reach the first camera 140 during the full exposure period of the shutter resulting in the first camera 140 capturing the full and/or maximum pixel brightness produced by the reflected photons 22. This is generally illustrated in the graph of FIG. 4 showing the brightness of a pixel contacted by three photon pulses 22 at three different times overlayed by the pixel sensitivity/gain during the shutter $S_{C1}$ of the first camera 140 and the pixel sensitivity/gain during the shutter $S_{C2}$ of the second camera 150. In FIG. 4, the rising edge of the shutter $S_{C1}$ of the first camera 140 begins at time $T_{1.1}$ (e.g., due to shutter jitter) and ends at time $T_{1.2}$, the full exposure period of the shutter $S_{C1}$ of the first camera 140 starts at time $T_{1.3}$, a first photon pulse 22 arriving at a first arrival time $T_{P1}$, a second photon pulse 22 arriving at a second arrival time $T_{P2}$, and a third photon pulse 22 arriving at a third arrival time $T_{P3}$. Each photon pulse 22 arrives at the first camera 140 i) after the end of the rising edge of the shutter $S_{C1}$ of the first camera 140 (i.e., rising edge end time $T_{1.2}$ occurs before the arrival times $T_{P1}$, $T_{P2}$, and $T_{P3}$) and ii) during the full exposure period of the shutter $S_{C1}$ of the first camera 140 (i.e., full exposure start time $T_{1.3}$ occurs before arrival times $T_{P1}$, $T_{P2}$, and $T_{P3}$) resulting in the first camera 140 capturing the full and/or maximum pixel brightness produced by each photon pulse 22.

The delay generator 120 is configured to send a second camera trigger signal (SC trigger signal) to the second camera 150 with a delay (a second camera or SC delay) to trigger and/or shutter the second camera 150. The length of the SC delay is the amount of time between when the delay generator 120 sends the laser trigger signal and when it sends the SC trigger signal (i.e., SC delay=$T_{C2T}$−$T_{LaT}$). The delay generator 120 is configured to send the SC trigger signal to trigger/shutter the second camera 150 at a second trigger time $T_{C2T}$ such that a shutter of the second camera 150 begins as the reflected photons 22 reach the second camera 150 and/or the reflected photons 22 reach the second camera 150 during the rising edge of the second camera's shutter. As a result, the pixel brightnesses as detected and/or captured by the second camera 150 will vary based upon when a particular photon pulse 22 arrives during the rising edge (see, e.g., FIG. 4, $B_{P1.C2}$ for the first photon pulse and $B_{P2.C2}$ for the second photon pulse). The second trigger time $T_{C2T}$ and/or the length of the SC delay is set based on the desired detection range of the system 100 and, thus, the SC delay is shorter for shorter detection ranges and is longer for longer detection ranges. The first trigger time $T_{C1T}$ and the FC delay are different than the second trigger time $T_{C2T}$ and the SC delay, respectively. The delay generator 120 is configured to delay triggering of the second camera 150 (e.g., sending the SC triggering signal) relative to triggering of the first camera 140 (e.g., sending the FC triggering signal). In other words, the delay generator 120 is configured to trigger the second camera 150 after triggering the first camera 140.

This is also generally illustrated in the graph of FIG. 4 in which the rising edge of the shutter $S_{C2}$ of the second camera 150 begins at time $T_{2.1}$ (e.g., due to shutter jitter) and ends at time $T_{2.2}$, the full exposure period of the shutter $S_{C2}$ of the second camera 150 starts at time $T_{2.3}$, and the first, second, and third photon pulses 22 arrive at arrival times $T_{P1}$, $T_{P2}$, and $T_{P3}$, respectively. The rising edge of the shutter $S_{C2}$ of the second camera 150 starts at time $T_{2.1}$, which is prior to and/or before the arrival times $T_{P1}$, $T_{P2}$, and $T_{P3}$, and the rising edge of the shutter $S_{C2}$ of the second camera 150 ends at time $T_{2.2}$, which is subsequent to and/or after arrival times $T_{P1}$ and $T_{P2}$, respectively. In other words, the first and second photon pulses 22 each arrive at the second camera 150 during the rising edge of the shutter $S_{C2}$ of the second camera 150. The third photon pulse 22 arrives at time $T_{P3}$, which is after time $T_{2.2}$ at which the rising edge of the shutter $S_{C2}$ of the second camera 150 ends and is during the full exposure period of the shutter $S_{C2}$ of the second camera 150 (i.e., third arrival time $T_{P3}$ occurs after both time $T_{2.2}$ and time $T_{2.3}$) resulting in the second camera 150 capturing the full and/or maximum pixel brightness produced by the third photon pulse 22. The arrival time and/or the TOF of the first and second photon pulses 22 can be determined by the system 100 from the frame captured by the shutter $S_{C2}$ of the second camera 150 in the example of FIG. 4 since they arrived during the rising edge of the second camera's shutter $S_{C2}$. The exact arrival time of the third photon pulse 22 cannot be determined by the system 100 from the frame captured by the second camera 150 in the example of FIG. 4, however, because the third photon pulse 22 did not arrive during the rising edge of the second camera's shutter $S_{C2}$. Nevertheless, the system 100 can determine that the arrival time of the third photon 22 falls and/or lies within a certain time frame/range from the frame captured by the shutter $S_{C2}$ of the second camera 150 (e.g., within a range of time equivalent to the exposure time of the second camera 150 that starts at time $T_{2.3}$) because the third photon pulse 22 arrived during the full exposure period of the second camera's shutter $S_{C2}$.

The computer 160 is operatively connected (e.g., communicatively and/or physically) to the first camera 140 and the second camera 150. The computer 160 includes a (one or more) processor and a memory that communicates with each other, and with other components, via a bus (e.g., a memory bus, a memory controller, a peripheral bus, a local bus, and any combinations thereof, using any of a variety of bus architectures). Memory can include various components (e.g., machine-readable media) including, but not limited to, a random-access memory component, a read-only component, and any combinations thereof. Memory can also include (e.g., stored on one or more machine-readable media) instructions (e.g., software) embodying any one or more of the aspects and/or methodologies of the present disclosure.

The computer 160 is configured to determine a respective shutter jitter adjustment value $T_{SJA}$ for a frame captured by the second camera 150 (i.e., an edge frame) based on the second output signal and a jitter calibration curve, and to suppress variation in and/or normalize the second output signal (e.g., the output and/or detected pixel brightness of each pixel in the captured frame) using the first output signal (e.g., the output and/or detected pixel brightness of each pixel in the captured frame). The computer 160 is also configured to determine a measured arrival time $T_M$ for a pixel in the edge frame and/or for an associated photon pulse 22 that hit the pixel and/or was detected by the pixel based on the pixel's normalized brightness and a brightness-time calibration curve, to determine an adjusted arrival time $T_A$ for the pixel and/or the associated photon pulse 22 utilizing the pixel's measured arrival time $T_M$ and the shutter jitter adjustment value $T_{SJA}$ of the edge frame, and to determine and/or calculate a TOF for the pixel and/or the associated photon pulse 22 based on the adjusted arrival time $T_A$ of the pixel and/or the laser trigger time $T_{LaT}$. The computer 160 is further configured to determine a distance for the pixel and/or the associated photon pulse 22 from the pixel's adjusted arrival time $T_A$, to determine and/or obtain a 3D coordinate (x-position, y-position, z-position) associated with the pixel based on the pixel's calculated/determined distance and the pixel's position on the sensor array 152, and to generate a 3D point cloud for the edge frame utilizing the 3D coordinates associated with the pixels in the edge frame. In examples, the computer 160 is configured to generate 3D point clouds for a plurality of (e.g., sequentially captured) edge frames to provide real-time 3D imaging of the environment 10 and/or one or more objects 12 therein. Optionally, the computer 160 is configured to determine a measured arrival time $T_M$, an adjusted arrival time $T_A$, a TOF, a distance, and an associated 3D coordinate for each pixel in an edge frame and/or for each lit pixel in an edge frame. A lit pixel of a frame is a pixel that was hit/contacted by a photon pulse 22 and/or that detected a photon pulse 22 in the frame.

Figure 6:
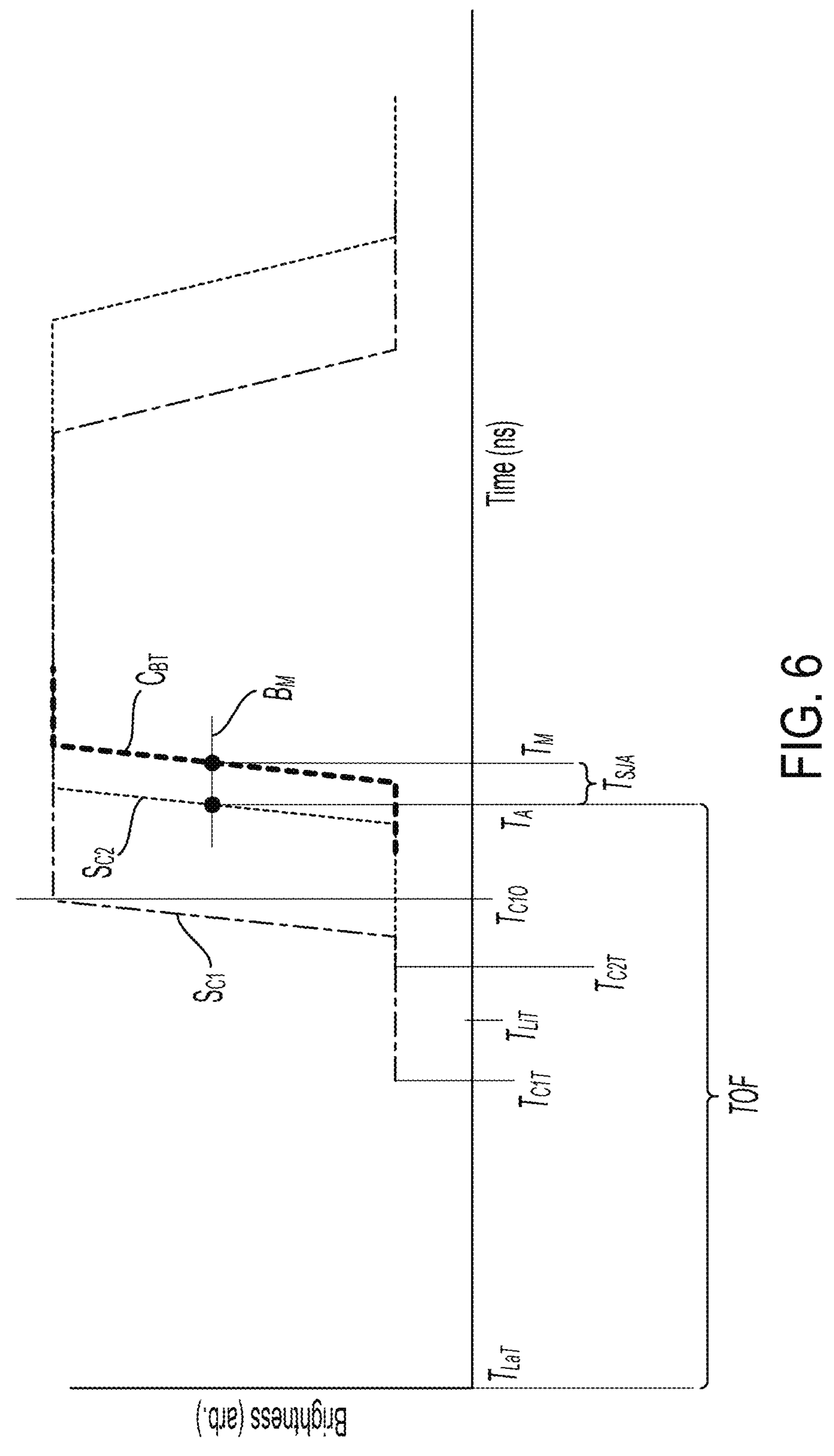
FIG. 6 is an exemplary pixel brightness vs. time graph showing a shutter of the first camera, a shutter of the second camera, a brightness-time calibration curve, and a visible representation of one or more values involved in an exemplary method of 3D imaging with the system.

According to the disclosure, an exemplary method of 3D imaging with the system 100 (e.g., via operating the system 100) includes the following steps and/or processes. FIG. 6 depicts a pixel brightness vs. time graph showing the shutter $S_{C1}$ of the first camera 140, the shutter $S_{C2}$ of the second camera 150, the brightness-time calibration curve $C_{BT}$, and a visible representation of one or more values involved in an exemplary method of 3D imaging with the system 100. In FIG. 6, $T_{LaT}$ is the laser trigger time (i.e., the time at which the delay generator 120 sends the laser trigger signal and/or the laser source 110 emits the laser pulse 20), $T_{LiT}$ is the time at which the delay generator 120 sends the light trigger signal and/or the light source 130 emits the light 30, $T_{C1T}$ is the time at which the delay generator 120 sends the FC trigger signal, $T_{C1O}$ is the time at which the shutter $S_{C1}$ of the first camera 140 is fully open (i.e., the start of the full exposure period of the shutter $S_{C1}$ of the first camera 140), $T_{C2T}$ is the time at which the delay generator 120 sends the SC trigger signal, $B_M$ is the normalized brightness of the pixel in the frame captured by the second camera 150, $T_M$ is the measured arrival time located at the intersection of the normalized brightness $B_M$ and the brightness-time calibration curve $C_{BT}$, $T_{SJA}$ is the shutter jitter and/or shutter jitter adjustment value of the frame captured by the second camera 150, $T_A$ is the adjusted arrival time (i.e., the time at which a reflected photon pulse 22 of the laser pulse 20 arrived at the cameras 140, 150 and/or hit the sensory array thereof) located at the intersection of the normalized brightness $B_M$ and the second camera's shutter $S_{C2}$, and TOF is the time-of-flight of the photon pulse 22 (i.e., TOF=$T_A$−$T_{LaT}$). In examples, such as the one in FIG. 6, the laser trigger time $T_{LaT}$ is set to and/or considered to be 0 ns and, consequently, the TOF is equal to the adjusted arrival time $T_A$.

During the method, the delay generator 120 sends the laser trigger signal to the laser source 110 to trigger and/or actuate the laser source 110. The laser source 110 receives the laser trigger signal causing the laser source 110 to output and/or emit a laser, laser beam, and/or one or more laser pulses 20 (i.e., photons) into the environment 10 and/or to an object 12 disposed in the environment 10. The time at which the delay generator 120 sends the laser trigger signal and/or the laser source 110 emits the laser pulse 20 may be referred to as the laser trigger time $T_{LaT}$.

The laser pulse 20 strikes, contacts, and/or impinges on the object 12. The object 12 provides one or more photons and/or photon pulses 22 when contacted, struck, and/or impinged by the laser pulse 20. In some examples, the object 12 provides the photons and/or photon pulses 22 by reflecting at least some photons of the laser pulse 20. The reflected photons 22 travel back toward and/or to the system 100 and are detected, captured, and/or collected by the cameras 140, 150 (e.g., one or more pixels of the respective sensor array).

After sending the laser trigger signal, the delay generator 120 sends the FC trigger signal to the first camera 140 with the FC delay (e.g., once an amount of time equivalent to the FC delay has passed since sending the laser trigger signal) to trigger/shutter the first camera 140 at the first trigger time $T_{C1T}$ and capture a frame. Subsequently, the delay generator 120 sends the SC trigger signal to the second camera 150 with the SC delay (e.g., once an amount of time equivalent to the SC delay has passed since sending the laser trigger signal) to trigger/shutter the second camera 150 at the second trigger time $T_{C2T}$ and capture a frame. For clarity, the frame captured by the first camera 140 may be considered and/or referred to as the normalization frame, while the frame captured by the second camera 150 may be considered and/or referred to as the edge frame.

The delay generator 120 also sends the light trigger signal to the light source 130 with the LS delay (e.g., once an amount of time equivalent to the LS delay has passed since sending the laser trigger signal) to trigger, activate, and/or pulse the light source 130 at light trigger time $T_{LiT}$. The delay generator 120 sends the LS trigger signal to trigger, activate, and/or actuate the light source 130 such that the light 30 emitted by the light source 130 arrives at and/or contacts the second camera 150 (e.g., the sensor array 152 thereof) at and/or around the same time as the reflected photons 22 provided by the environment 10. The light trigger signal is typically sent prior to sending the SC trigger signal to the second camera 150 (e.g., before and/or earlier than $T_{C2T}$). However, the light trigger signal may be sent before and/or after sending the FC trigger signal to the first camera 140 (e.g., before and/or after $T_{C1T}$).

The cameras 140, 150 receive and are triggered and/or shuttered by the FC trigger signal and the SC trigger signal, respectively, causing the cameras 140, 150 to each capture a frame. Triggering and/or shuttering of the cameras 140, 150 and/or capturing a frame includes receiving, measuring, detecting, and/or collecting reflected photons 22 of the laser pulse 20 emitted by the laser source 110. Triggering and/or shuttering of the second camera 150 and/or capturing an edge frame also includes receiving, measuring, detecting, and/or collecting the light 30 emitted by the light source 130. Only a specific, predetermined subset of the pixels of the sensor array 152 of the second camera 150, which may be referred to as LED pixels, receive and/or capture the light 30 emitted by the light source 130. Another subset of the pixels of the sensor array 152 (e.g., the remainder of the pixels) of the second camera 150 receive and/or capture the reflected photons 22 received from the environment 10. Conversely, all or substantially all of the pixels of the sensor array of the first camera 140 receive and/or capture the reflected photons 22 received from the environment 10. In other words, the first camera 140 does not receive, measure, detect, and/or collect the light 30 emitted by the light source 130. The first camera 140 then sends the first output signal to the computer 160, and the second camera 150 sends the second output signal to the computer 160. The computer 160 receives the first and second output signals and, based on these signals, performs several operations, processes, calculations, and/or determinations described further below.

Figure 7:
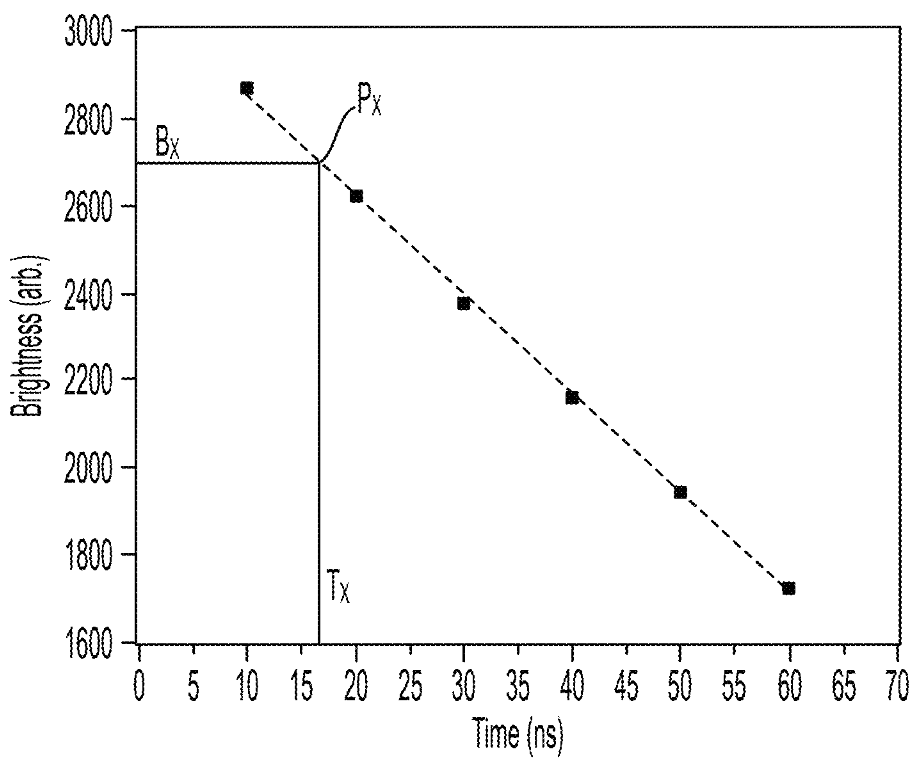
FIG. 7 is an exemplary jitter calibration curve.

The computer 160 determines the shutter jitter and/or a shutter jitter adjustment value $T_{SJA}$ (in nanoseconds) for the edge frame utilizing i) a summation of a subset of the outputs of the second camera signal and ii) a jitter calibration curve. The outputs of the LED pixels are the subset of outputs that are summed (i.e., added together) and utilized in this determination. An exemplary jitter calibration curve is depicted in FIG. 7 in which the shutter jitter and/or shutter jitter adjustment value (in ns) is presented along the X-axis and pixel brightness presented along the Y-axis. To determine the shutter jitter and/or shutter jitter adjustment value $T_{SJA}$, the computer 160 determines, finds, and/or locates a time associated with a point on the jitter calibration curve having a pixel brightness value corresponding and/or equal to the summed pixel brightnesses of the LED pixels in the edge frame. This summation may be referred to as the summed LED pixel brightness of the edge frame. For example, to determine the shutter jitter and/or shutter jitter adjustment value $T_{SJA}$ for an exemplary edge frame having a summed LED pixel brightness $B_X$, the computer 160 determines, finds, and/or locates a point $P_X$ on the jitter calibration curve with a pixel brightness value corresponding and/or equal to the summed LED pixel brightness $B_X$, and determines, finds, and/or locates the time $T_X$ associated with point $P_X$ on the jitter calibration curve. The computer 160 would thus determine that the exemplary edge frame has a shutter jitter and/or a shutter jitter adjustment value $T_{SJA}$ equal to time $T_X$.

The computer 160 suppresses variation in and/or normalizes the second output signal (e.g., the output and/or detected pixel brightness of each pixel in the captured frame) using the first output signal (e.g., the output and/or detected pixel brightness of each pixel in the captured frame). The variation is suppressed and/or the second output signal is normalized via dividing the respective pixel brightness of each pixel and/or each lit pixel in the edge frame by the pixel brightness (i.e., the full and/or max brightness intensity) of a corresponding pixel in the normalization frame to obtain a normalized pixel brightness of each pixel and/or each lit pixel in the edge frame. Pixels in the edge frame and the normalization frame correspond to one another when they are disposed in the same position on their respective sensor array. For example, the pixel disposed on the sensor array of the first camera 140 in a 5×4 position (i.e., the fifth column and fourth row of a grid of pixels) and the pixel disposed on the sensor array 152 of the second camera 150 in a 5×4 position (i.e., the fifth column and fourth row of a grid of pixels) correspond to one another. By suppressing variation in the detected pixel brightnesses of the edge frame, the computer 160 effectively converts the detected pixel brightnesses of the edge frame into normalized pixel brightnesses.

Figure 8:
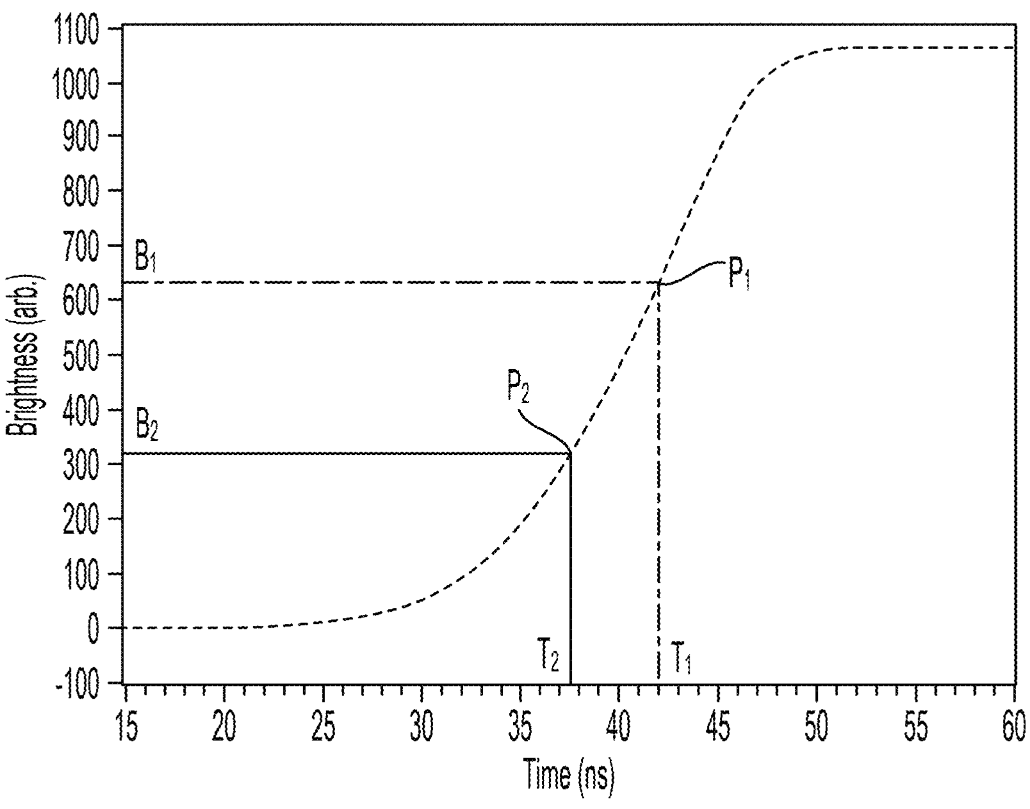
FIG. 8 is an exemplary brightness-time calibration curve.

Next, the computer 160 determines a respective measured arrival time $T_M$ for a pixel in the edge frame based on the pixel's normalized pixel brightness and a brightness-time calibration curve. As the measured arrival time $T_M$ is determined utilizing the pixel's normalized pixel brightness, the measured arrival time $T_M$ may additionally and/or alternatively be considered to be determined based on the first output signal and the second output signal. An exemplary brightness-time calibration curve is depicted in FIG. 8. The laser trigger time $T_{LaT}$ typically defines the zero time and/or the time origin (i.e., 0 ns) of the brightness-time calibration curve.

To determine the measured arrival time $T_M$ for a pixel, the computer 160 determines, finds, and/or locates a time associated with a point on the brightness-time calibration curve having a pixel brightness value corresponding and/or equal to the normalized pixel brightness for the pixel. As illustrated in FIG. 8 for example, for an exemplary first pixel in the edge frame having a normalized pixel brightness of $B_1$, the computer 160 determines, finds, and/or locates point $P_1$ on the brightness-time calibration curve with a pixel brightness value corresponding and/or equal to the normalized pixel brightness $B_1$, and determines, finds, and/or locates the time $T_1$ associated with point $P_1$ on the brightness-time calibration curve. For an exemplary second pixel in the edge frame having a normalized pixel brightness of $B_2$, the computer 160 determines, finds, and/or locates point $P_2$ on the brightness-time calibration curve with a pixel brightness value corresponding and/or equal to the normalized pixel brightness $B_2$, and determines, finds, and/or locates the time $T_2$ associated with point $P_2$ on the brightness-time calibration curve. The computer 160 would thus determine that the exemplary first and second pixels of the edge frame and/or the reflected photon pulses 22 associated therewith have a measured arrival time $T_M$ of $T_1$ and $T_2$, respectively.

The computer 160 then accounts and/or adjusts for the shutter jitter of the second camera 150 when capturing the edge frame using the measured arrival time $T_M$ of the pixel and the determined shutter jitter and/or shutter jitter adjustment value $T_{SJA}$ of the edge frame. Accounting and/or adjusting for the shutter jitter includes subtracting the shutter jitter and/or shutter jitter adjustment value $T_{SJA}$ from the measured arrival time $T_M$ of the pixel to determine and/or calculate an adjusted arrival time $T_A$ for the pixel. For example, for an exemplary pixel having a measured arrival time $T_M$ of 45 ns and an edge frame having a shutter adjustment value $T_{SJA}$ of 15 ns, the computer 160 would subtract 15 ns from 45 ns to determine and/or calculate that the exemplary pixel has an adjusted arrival time $T_A$ of 30 ns.

The computer 160 then determines and/or calculates the TOF for a pixel and/or the associated photon pulse 22 that contacted the pixel based on the adjusted arrival time $T_A$ of the pixel and/or the laser trigger time $T_{LaT}$. The determination and/or calculation of the TOF is, thus, based at least indirectly on the first output signal, the second output signal, the brightness-time calibration curve, and/or the jitter calibration curve. The computer 160 determines and/or calculates the TOF for a pixel and/or the associated photon pulse 22 by subtracting the laser trigger time $T_{LaT}$ from the adjusted arrival time $T_A$. In examples, such as the one in FIG. 6, the laser trigger time $T_{LaT}$ is set to and/or considered to be 0 ns (e.g., utilized as the time origin) and, consequently, the TOF is simply equal to the adjusted arrival time $T_A$. In such examples, the computer 160 may therefore determine that the TOF is equal to the adjusted arrival time $T_A$ or, alternatively, the method may not include the step of determining the TOF and the computer 160 may utilize the arrival time $T_A$ to determine a distance for the pixel in the next step.

The computer 160 then converts the TOF for the pixel in the edge frame into a distance utilizing the equation $$D = \frac{(TOF) \times c}{2},$$

in which D is the distance, c is the speed of light, and TOF (time-of-flight) is the determined TOF for the pixel. The distance D is a z-direction distance between the second camera 150 and the object 12 in the environment 10 that reflected the photon pulse 22 that contacted and/or was detected by the pixel.

Next, the computer 160 determines/obtains a 3D coordinate (x-position, y-position, z-position) associated with the pixel in the edge frame based on the pixel's calculated/determined distance and the pixel's position (x-position, y-position) on the sensor array 152 of the second camera 150. A pixel's position (x-position, y-position) on the sensor array 152 of the second camera 150 may correspond to and/or be based on the pixel's position in a pixel grid (e.g., the pixel's position in the fifth column and fourth row of the pixel grid).

The method includes the computer 160 determining a measured arrival time $T_M$, an adjusted arrival time $T_A$, a TOF, a distance, and an associated 3D coordinate for each pixel in an edge frame and/or for each lit pixel in an edge frame according to the above-described processes. The computer 160 then generates and/or provides a 3D point cloud for the edge frame utilizing the 3D coordinates associated with the pixels in the edge frame. Generating the 3D point cloud may include, for example, compiling, plotting, and/or assembling, in the same 3D coordinate system, several 3D coordinates that are each associated with a pixel in the edge frame. Optionally, the computer 160 repeats the above-described processes and/or steps to generate 3D point clouds for a plurality of (e.g., sequentially captured) edge frames to provide real-time 3D imaging of the environment 10 and/or one or more objects 12 therein.

Conceivably, the shutter jitter of the second camera 150 may be sufficiently small and/or short to not meaningfully impact or influence the determination of the TOF of a photon pulse 22. In exemplary systems 100 having such a second camera 150, the system 100 and/or the second camera 150 does not include a light source 30 and the method of 3D imaging i) does not include calculating a shutter jitter and/or shutter jitter adjustment value $T_{SJA}$, ii) does not include determining and/or calculating an adjusted arrival time $T_A$, and iii) the measured arrival time $T_M$ is used to calculate the TOF and/or the distance of the pixel.

In some examples, the delay generator 120 does not trigger the laser source 110. Rather, the laser source 110 is triggered (e.g., by the computer 160) and sends a source signal to the delay generator 120. The source signal is an indication that the laser pulse 20 has been emitted and includes a time origin of the laser pulse 20 and/or information indicative of the time origin of the laser pulse 20. The delay generator 120 receives the source signal and, in response, sends the FC trigger signal with the FC delay and sends the SC trigger signal with the SC delay based on the time origin of the laser pulse 20. In such a configuration, the time origin of the laser pulse 20 would be equivalent to and/or represented by the laser trigger time $T_{LaT}$.

In one exemplary system 100, the cameras 140, 150 are each a Basler acA720-520 um camera. The laser source 110 is a femtosecond amplifier, such as a KMlabs Red Dragon having a center wavelength of 800 nm, a pulse duration of 30 fs, a repetition rate of 1 kHz, and a pulse energy of <1 uJ/pulse. The delay generator 120 is a DG535 from Stanford Research System. The laser trigger-out is produced using a Thorlabs photodiode (DET10A). The femtosecond laser pulse 20 allows direct characterization of the timing performance of the system 100 without deconvolution. Both cameras 140, 150 are connected to the computer 160 with USB3 cables, and image data is streamed at 1000 frames/s at a resolution of 720×260 pixels via the first and second output signals. The cameras 140, 150 have a rise time $T_R$ of around 12.9 ns, a fall time fall time $T_F$ or around 19.6 ns, and an exposure time of around 1 μs, resulting in the system 100 having a dynamic range of about 45. The system 100 has a detection range of roughly 2 m when operated with fixed delays (e.g., LS delay, FC delay, and/or SC delay). The detection range can be expanded by varying the SC delay between frames. This will reduce the frame rate of the second camera 150. Nevertheless, since CMOS cameras are capable of capturing 1000 frames per second (fps) or more at a decent resolution (e.g. 720×260 pixels), a full 3D frame rate of more than 10 Hz can be achieved while extending the detection range to 200 m when the SC delay is adjusted/changed around one hundred times per second are utilized by the system 100. The detection range of the system 100 and/or method can also be expanded by utilizing a slower rising edge (e.g., a rising edge with a longer rise time $T_R$) and/or falling edge (e.g., a falling edge with a longer fall time $T_F$). A system 100 utilizing the falling edge 34 of the shutter depicted in FIG. 3B, for example, would have a detection range that is greater (e.g., by more than 50%) than the detection range of a system 100 utilizing the rising edge 32.

In examples, the computer 160 may include an electronic controller and/or include an electronic processor, such as a programmable microprocessor and/or microcontroller. The computer 160 may include, for example, an application specific integrated circuit (ASIC), a central processing unit (CPU), a memory (e.g., a non-transitory computer-readable storage medium), and/or an input/output (I/O) interface. The computer 160 may be configured to perform various functions, including those described in greater detail herein, with appropriate programming instructions and/or code embodied in software, hardware, and/or other medium. In examples, the computer 160 may be connected to a display, such as a touchscreen display.

It should be understood that the computer 160 as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having ROM, RAM, RAM and ROM, and/or a combination of non-volatile and volatile memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute via one or more processors, such as multiple processors that are integrated into a single system or are distributed over and connected together through a communications network, and the communications network may be wired and/or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first element could be termed a second element, and, similarly, a second element could be termed a first element, without departing from the scope of the various described embodiments. The first element and the second element are both elements, but they are not the same element.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the phrase at least one of successive elements separated by the word "and" (e.g., "at least one of A and B") is to be interpreted the same as the term "and/or" and as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Joinder references (e.g., attached, coupled, connected, and the like) are to be construed broadly and may include intermediate members between a connection of elements, relative movement between elements, direct connections, indirect connections, fixed connections, movable connections, operative connections, indirect contact, and/or direct contact. As such, joinder references do not necessarily imply that two elements are directly connected/coupled and in fixed relation to each other. Connections of electrical components, if any, may include mechanical connections, electrical connections, wired connections, and/or wireless connections, among others. Uses of "e.g." and "such as" in the specification are to be construed broadly and are used to provide non-limiting examples of embodiments of the disclosure, and the disclosure is not limited to such examples.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

All matter contained in the above description or shown in the accompanying drawings shall be interpreted as illustrative only and not limiting. Changes in detail or structure may be made without departing from the present disclosure.

What is claimed is:

1. A 3D imaging system, comprising:
- a laser source configured to emit a laser pulse;
- a first camera and a second camera each arranged and oriented to detect reflected photons of the laser pulse emitted by the laser source;
- a delay generator connected to the laser source, the first camera, and the second camera, the delay generator configured to provide a plurality of signals that active at least one of the laser source, the first camera, and the second camera; and
- a computer communicatively coupled to the first camera and the second camera;
- wherein the computer is configured to:
  - receive a first output signal from the first camera;
  - receive a second output signal from the second camera;
  - determine a time-of-flight based at least partially on the first output signal, the second output signal, and a brightness-time calibration curve;
  - convert the time-of-flight to a distance;
  - determine a 3D coordinate based at least partially on the distance; and
  - generate a 3D point cloud utilizing the 3D coordinate.

2. The system of claim 1, wherein the system is implemented in a light detection and ranging (LIDAR) apparatus.

3. The system of claim 1, wherein the first camera has a first shutter delay such that the reflected photons of the laser pulse arrive at the first camera during a full exposure period of a shutter of the first camera.

4. The system of claim 1, wherein the second camera has a second shutter delay such that the reflected photons of the laser pulse arrive at the second camera during a rising edge of a shutter of the second camera.

5. The system of claim 1, further comprising a light source operatively coupled to the delay generator, wherein the light source is positioned and oriented to emit light to the second camera.

6. The system of claim 5, wherein the computer is further configured to:
- determine a shutter jitter adjustment value for a frame captured by the second camera based on the second output signal and a jitter calibration curve;
- determine a measured arrival time for a pixel in the frame based on the first output signal, the second output signal, and a brightness-time calibration curve;
- determine an adjusted arrival time for the pixel based on the measured arrival time and the shutter jitter adjustment value; and
- determine the time-of-flight based at least partially on the adjusted arrival time.

7. The system of claim 5, wherein the light source is positioned and oriented relative to the first camera such that the first camera does not detect the light emitted by the light source.

8. The system of claim 5, wherein the second camera includes the light source.

9. The system of claim 8, wherein the light source is arranged on and connected to a sensor array of the second camera.

10. The system of claim 5, wherein:
- the second camera includes a sensor array including a plurality of pixels;
- the light source overlaps a subset of the plurality of pixels of the sensor array of the second camera; and
- only the subset of the plurality of pixels of the sensor array of the second camera receive the light emitted by the light source.

11. The system of claim 10, wherein the light source and the subset of the plurality of pixels are disposed at a corner of the sensor array.

12. The system of claim 5, wherein the light source is an LED light, the first camera is a first complementary metal-oxide semiconductor (CMOS) camera, and the second camera is a second CMOS camera.

13. A 3D imaging system, comprising:
- a laser source configured to emit a laser pulse;
- a light source;
- a first camera arranged and oriented to detect reflected photons of the laser pulse emitted by the laser source;
- a second camera arranged and oriented to detect (i) reflected photons of the laser pulse emitted by the laser source and (ii) light emitted by the light source;
- a delay generator connected to the laser source, the light source, the first camera, and the second camera, the delay generator configured to provide a plurality of signals that active at least one of the laser source, the light source, the first camera, and the second camera; and
- a computer communicatively coupled to the first camera and the second camera;
- wherein the first camera has a first shutter delay such that the reflected photons of the laser pulse arrive at the first camera during a full exposure period of a shutter of the first camera;
- wherein the second camera has a second shutter delay such that the reflected photons of the laser pulse arrive at the second camera during a rising edge of a shutter of the second camera;
- wherein the computer is configured to:
  - receive a first output signal from the first camera;
  - receive a second output signal from the second camera;
  - determine a shutter jitter adjustment value for a frame captured by the second camera based on the second output signal and a jitter calibration curve;

determine a measured arrival time for a pixel in the frame based on the first output signal, the second output signal, and a brightness-time calibration curve;

determine an adjusted arrival time for the pixel based on the measured arrival time and the shutter jitter adjustment value;

determine a time-of-flight for the pixel based at least partially on the adjusted arrival time;

convert the time-of-flight to a distance;

determine a 3D coordinate associated with the pixel based at least partially on the distance; and generate a 3D point cloud utilizing the 3D coordinate.

14. A method of 3D imaging, comprising:

emitting a laser pulse via a laser source;

shuttering a first camera and shuttering a second camera to capture a respective frame to detect reflected photons of the laser pulse;

sending a first output signal from the first camera to a computer, the first output signal corresponding to the frame captured by the first camera;

sending a second output signal from the second camera to the computer, the second output signal corresponding to the frame captured by the second camera;

determining, via the computer, a time-of-flight based on the first output signal, the second output signal, and a brightness-time calibration curve;

converting the time-of-flight to a distance;

determining a 3D coordinate based at least partially on the distance; and generating a 3D point cloud utilizing the 3D coordinate.

15. The method of claim 14, wherein the first camera is shuttered with a first shutter delay such that the reflected photons of the laser pulse arrive at the first camera during a full exposure period of the shutter of the first camera.

16. The method of claim 14, wherein the second camera is shuttered with a second shutter delay such that the reflected photons of the laser pulse arrive at the second camera during a rising edge of the shutter of the second camera.

17. The method of claim 14, further comprising:

emitting light with a light source;

detecting the light emitted by the light source when shuttering the second camera, the light detected by a subset of pixels of a sensor array of the second camera;

determining a shutter jitter adjustment value for the frame captured by the second camera using i) a summation of a subset of outputs included in the second output signal and ii) a jitter calibration curve, the subset of outputs provided by the subset of pixels that detected the light emitted by the light source;

normalizing the second output signal using the first output signal to obtain a normalized pixel brightness for a pixel in the frame captured by the second camera;

determining a measured arrival time for the pixel based on the normalized pixel brightness of the pixel and a brightness-time calibration curve; and determining an adjusted arrival time for the pixel based on the measured arrival time and the shutter jitter adjustment value;

wherein the time-of-flight is determined using the adjusted arrival time.

18. The method of claim 14, further comprising emitting light with a light source, wherein shuttering the second camera includes detecting the light emitted by the light source.

19. The method of claim 14, further comprising determining a shutter jitter adjustment value for the frame captured by the second camera based on the second output signal and a jitter calibration curve.

20. The method of claim 19, further comprising:

determining a measured arrival time for a pixel in the frame captured by the second camera based at least on the second output signal and a brightness-time calibration curve; and determining an adjusted arrival time for the pixel based on the measured arrival time and the shutter jitter adjustment value;

wherein the time-of-flight is determined based on the adjusted arrival time.

* * * * *